United States Patent [19]

Germer

[11] Patent Number: 4,713,210
[45] Date of Patent: Dec. 15, 1987

[54] CONTROL ROD DRIVELINE AND GRAPPLE

[75] Inventor: John H. Germer, San Jose, Calif.

[73] Assignee: General Electric Company, San Jose, Calif.

[21] Appl. No.: 798,778

[22] Filed: Nov. 18, 1985

[51] Int. Cl.⁴ .................... G21C 7/12; G21C 19/10
[52] U.S. Cl. ................................ 376/233; 376/262; 376/336; 294/86.4; 294/906
[58] Field of Search .............. 376/233, 336, 262; 294/86.4, 906

[56] References Cited

U.S. PATENT DOCUMENTS

| | | | |
|---|---|---|---|
| 3,726,557 | 4/1973 | Ventre | 294/86.4 |
| 3,851,987 | 12/1974 | Jones | 294/86.4 |
| 3,976,543 | 8/1976 | Sowa | 376/336 |
| 4,227,967 | 10/1980 | Zebroski | 376/327 |
| 4,411,857 | 10/1983 | Sridhar | 376/233 |
| 4,582,675 | 4/1986 | Germer | 376/233 |

Primary Examiner—David H. Brown
Assistant Examiner—Richard L. Klein
Attorney, Agent, or Firm—Ivor J. James, Jr.; Raymond G. Simkins

[57] ABSTRACT

A control rod driveline and grapple is disclosed for placement between a control rod drive and a nuclear reactor control rod containing poison for parasitic neutron absorption required for reactor shutdown. The control rod is provided with an enlarged cylindrical handle which terminates in an upwardly extending rod to provide a grapple point for the driveline. The grapple mechanism includes a tension rod which receives the upwardly extending handle and is provided with a lower annular flange. A plurality of preferably six grapple segments surround and grip the control rod handle. Each grapple rod segment grips the flange on the tension rod at an interior upper annular indentation, bears against the enlarged cylindrical handle at an intermediate annulus and captures the upwardly flaring frustum shaped handle at a lower and complementary female segment. The tension rods and grapple segments are surrounded by and encased within a cylinder. The cylinder terminates immediately and outward extending annulus at the lower portion of the grapple segments. Excursion of the tension rod relative to the encasing cylinder causes rod release at the handle by permitting the grapple segments to pivot outwardly and about the annulus on the tension rod so as to open the lower defined frustum shaped annulus and drop the rod. Relative movement between the tension rod and cylinder can occur either due to electromagnetic release of the tension rod within defined limits of travel or differential thermal expansion as between the tension rod and cylinder as where the reactor exceeds design thermal limits.

3 Claims, 13 Drawing Figures

FIG._1.

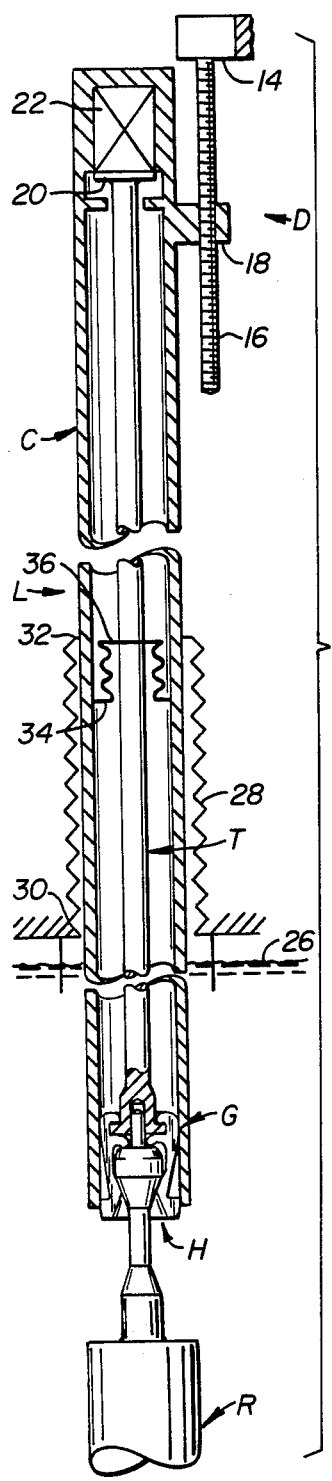
FIG._1.
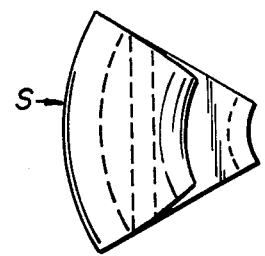
FIG._4B.
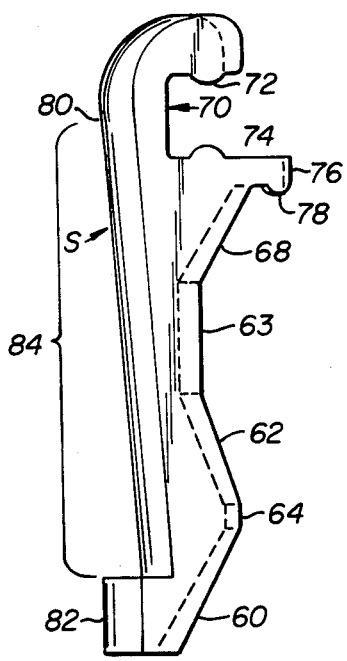
FIG._4A.
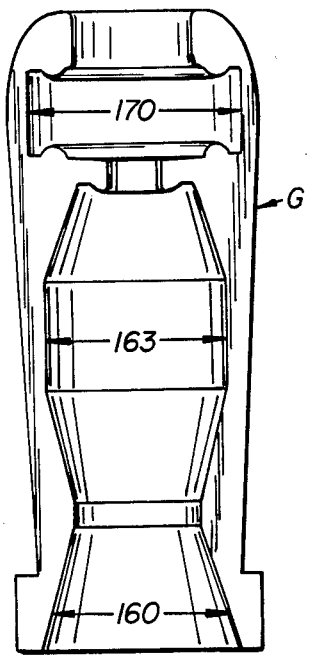
FIG._4C.

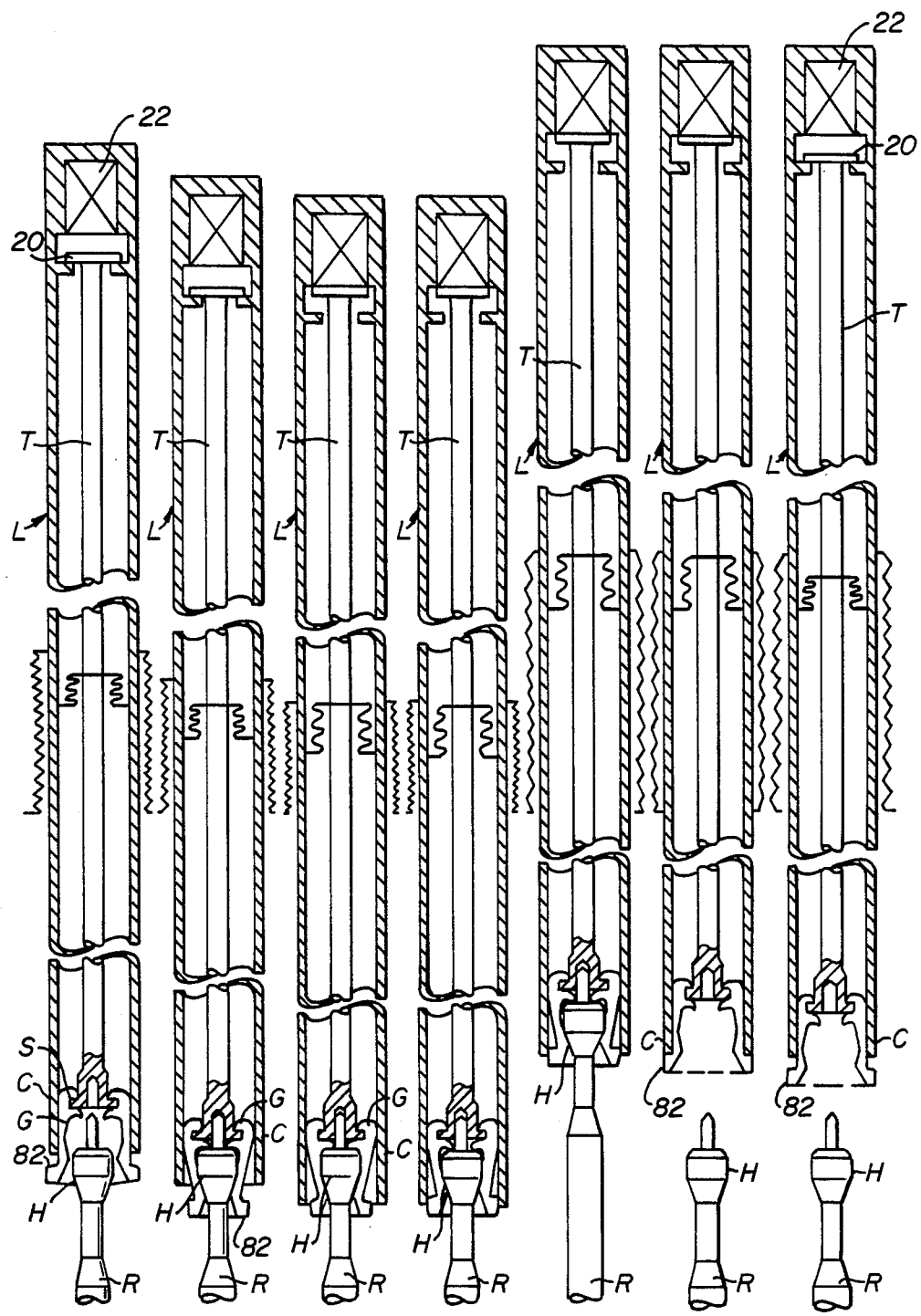
FIG.\_2A. FIG.\_2B. FIG.\_2C. FIG.\_2D. FIG.\_2E. FIG.\_2F. FIG.\_2G.

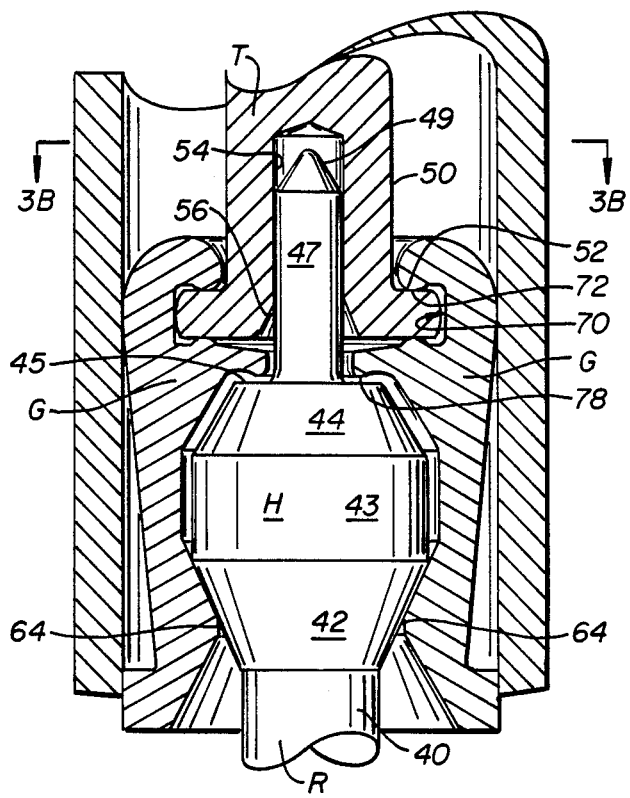
FIG._3A.
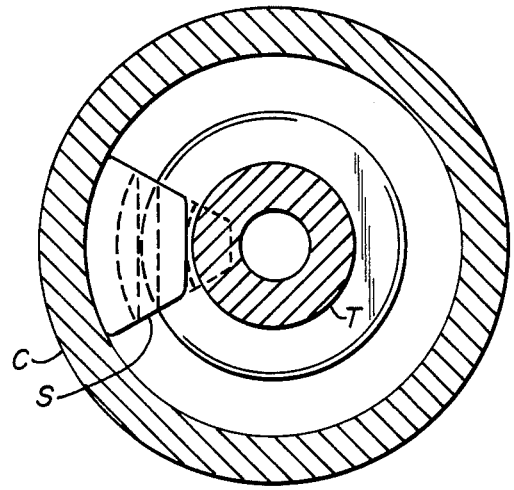
FIG._3B.

4,713,210

CONTROL ROD DRIVELINE AND GRAPPLE

REFERENCE TO GOVERNMENT-RELATED APPLICATIONS

The U.S. Government has rights in this invention under Contract No. DE-AT03-76SF70030 in 24-BR-04817.

This invention relates to a rod grapple and driveline mechanism for placement between a poison containing rod for parasitic neutron absorption required for shutdown of a fission reactor and a rod drive mechanism. More particularly, a rod driveline including a rod release mechanism is shown for operation in a fast neutron breeder reactor where rod release can occur responsive either to loss of electromagnetic rod retention power or alternately thermal rise of the reactor beyond set limits.

BACKGROUND OF THE INVENTION

Nuclear reactors are shut down by the insertion of rods containing poisons for parasitic neutron absorption. Rod drives are typically connected by drivelines to the rods.

A first form of rod driveline includes a mechanical connection, typically threaded, between the driveline and rod. A second type of driveline includes a driveline which can selectively attach and release a rod. This disclosure relates to this second type of driveline.

Rod release mechanism from drivelines are known. Moreover, thermally responsive rod release mechanisms are known. A common type of thermally responsive rod release mechanisms includes an electromagnetic coupling between the mechanism and a magnet. When the magnetic portion of the rod adjacent a magnet reaches the Curie point of the metal and becomes non-magnetic, rod release and drop occurs.

Rod excursion responsive to reactor overheat is known. See Zebroski U.S. Pat. No. 4,227,967. In this type of device, concentric cylinders of bimetallic differential expansion properties are series connected for maximum thermal excursion. When the reactor is too hot, rod insertion occurs. When the reactor cools and rod drive movement has occurred, rod withdrawal occurs.

SUMMARY OF THE INVENTION

A control rod driveline and grapple is disclosed for placement between a control rod drive and a nuclear reactor control rod. The control rod is provided with an enlarged cylindrical handle which terminates in an upwardly extending rod to provide a grapple point for the driveline. The grapple mechanism includes a tension rod which receives the upwardly extending handle and is provided with a lower annular flange. A plurality of preferably six grapple segments surround and grip the control rod handle at the flange. Each grapple rod segment grips the flange on the tension rod at an interior upper annular indentation, bears against the enlarged cylindrical handle at an intermediate annulus and captures the upwardly flaring frustum shaped handle at a lower and complementary female segment. The tension rod and grapple segments are surrounded by and encased within a cylinder. The cylinder terminates immediate an outward extending annulus at the lower portion of the grapple segments. Excursion of the tension rod relative to the encasing cylinder causes rod release at the handle. Rod release at the handle occurs by permitting the grapple segments to pivot outwardly and about the annulus on the tension rod so as to open the lower defined frustum shaped annulus and drop the rod. Relative movement between the tension rod and cylinder can occur either due to electromagnetic release of the tension rod within defined limits of travel or differential thermal expansion as between the tension rod and cylinder as where the reactor exceeds design thermal limits.

OTHER OBJECTS AND ADVANTAGES

An object of this invention is to disclose a simplified mechanical grapple for gripping and releasing a control rod at its handle. According to this aspect of the invention, the rod drive includes an inner tension rod and an outer cylinder. The lower end of the tension rod has an attached annular flange. The grapple includes a plurality of preferable six grapple segments. Each grapple segment pivots at an upper indentation about the flange and receives the rod handle at an lower indentation. Inward and outward movement of the grapple segments with respect to one another is restricted by relative motion between the tension rod and cylinder. The lower end of the cylinder restricts the rod segments towards one another. When the cylinder does not restrict the grapple segments, the handle of the rod can be received at the rod segments. Once the handle is received in the rod segments, the cylinder moves downwardly relative to the tension rod. The cylinder then restricts movement of the grapple segments. With the control rod handle captured, motorized and conventional slow driven movement of the control rod can occur.

A further object of this invention is to disclose a control rod grapple that interacts with a rod handle to effect grappling of the handle. According to this aspect, the grapple segments include two bearing surfaces, one for bearing on the top of the control rod handle and the other for bearing on the bottom surface of the flange attached to the tension rod. As the grapple segments come down over the control rod handle, a gathering surface at the bottom of the segments forces the control rod segments apart. Once the handle is fully received within the segments, the two bearing surfaces on the top of the control rod handle and on the bottom of the tension rod flange exert a torque on each rod segment. This torque causes the rod segments to move inwardly too and towards one another. Control rod capture at the handle occurs.

An advantage of this interaction between the control rod handle and grapple is that the grapple segments are disposed for capture by the surrounding cylinder. This cylinder maintains control rod handle capture until specific release is triggered, either by thermal excursion above design limits or alternately release of an electromagnetic keeper mechanism.

An advantage of the disclosed grapple is that it is actuated by relative movement between the interior tension rod and the exterior cylinder. This relative movement can be mechanical, electromechanical or thermal.

A further advantage of the driveline and grapple is that it is ideal for attachment to conventional slow drive units used for reactor control. Specifically, rod grappling can only occur under deliberate motorized drive control of the grapple. First, the driveline must be moved downwardly about the control rod handle. Second, the grapple closes and captures the control rod handle. Third, and only when the control rod handle and grapple are securely attached on the drive move both driveline and rod deliberately upward for reactor energizing.

No credible way exists with the disclosed driveline and grapple that will permit rapid rod withdrawal from the reactor.

Yet another advantage of the disclosed mechanism is that an electromagnetic connection is required to maintain the control rod within the grapple. Thus, traditional series circuitry for maintaining the electromagnetic grapple closure can be accommodated. Any interruption in the disclosed electromagnetic circuitry will result in the rod being released at the handle by the grapple and correspondent reactor SCRAM.

A further object of this invention is to disclose a thermal circuit breaker for use with a sodium cooled fast neutron breeder reactor. According to this aspect of the invention, the tension rod and cylinder are designed for bimetallic differential thermal expansion, the tension rod having a high index of thermal expansion, the cylinder having a low index of thermal expansion. Where a thermal design limit is exceeded in the reactor, the tension rod expands relative to the cylinder causing relative movement beyond a preselected limit at the vicinity of the grapple. With movement of the cylinder with respect to the grapple, the cylinder clears a male annulus at the upper end of the grapple. The grapple segments are free to pivot outwardly. The rod handle is released. Upon completion of the grapple segments pivotal motion, the rod is dropped, typically into a dash pot, and causes correspondent reactor SCRAM.

An advantage of this aspect of the invention is that an essentially shock proof thermal circuit breaker is disclosed. Damage to the driveline by extra ordinary causes such as earthquake and the like is highly unlikely; the disclosed thermal circuit breaker will drop rods and cause reactor SCRAM even though connected drives may be disabled.

A further advantage of this invention is that it is particularly suited to overhead rod release mechanisms, especially those kinds of overhead rod mechanisms that are commonly prescribed for sodium cooled fast neutron breeder reactors.

Yet another advantage of the disclosed grapple is that the grapple is essentially a thermal circuit breaker. SCRAM of a plant can be followed by reconnection of the drive unit at the grapple and resumption of ordinary control rod movement pursuant to drive movement.

BRIEF DESCRIPTION OF THE DRAWINGS

Other objects, features and advantages of this invention will be more apparent after referring to the following specification and attached drawings in which:

FIG. 1 is a side elevation section showing a conventional drive at the upper end, a control rod at the lower end and the driveline of this invention connection therebetween;

FIGS. 2A–2G are a cartoon series illustrating at FIGS. 2A–2E a cartoon series representation of grapple attachment and withdrawal of the rod;

FIG. 2F illustrates release of the rod responsive to differential thermal breaking of the rod circuit;

FIG. 2G illustrates electromagnetic release of the rod;

FIG. 3A is a section of the grapple illustrating the lower end of the tension rod, the lower end of the cylinder, the upwardly extending rod handle and the grapple mechanism;

FIG. 3B is a section along lines B—B of 3A; and,

FIGS. 4A, 4B and 4C are respective side elevations and plan of one of the grapple segments.

Referring to FIG. 1, a control rod R and a control rod drive D are illustrated connected by the driveline L. The control rod is provided with a handle section H which handle section is engaged by a grapple section G.

Drive D is conventional and only schematically illustrated. Specifically a drive gear motor 14 revolves a screw drive 16 which is received in a female drive nut 18 on the side of the driveline L. Presuming rod R is engaged at handle H by grapple G, up and down movement of drive nut 18 correspondly moves driveline L to effect withdrawal and insertion of rod R into the reactor.

Driveline L consists of two discrete segments. First, there is a tension rod T. Second there is an outer cylinder C. As will hereinafter become more apparent by relative downward movement of tension rod T relative to cylinder C, release of grapple mechanism G to drop handle H can occur. Such movement can occur by one of two expedients.

First, it will be seen that tension rod T includes an upper flange 20 for abutment to an electromagnet 22. Providing magnet 22 is energized, tension rod T will remain in the upper position with flange 20 abutted to electromagnet 22. Grapple G will remain closed with handle H therein. If magnet 22 has its power interrupted, the rod is dropped.

Secondly, it will be understood that tension rod T is made of a material having a high index of thermal expansion and cylinder C is made of a material having a low index of thermal expansion. Upon thermal heating of the drive line L, tension rod T will move downwardly with respect to cylinder C. As will be hereinafter be set forth, the grapple mechanism G will open. Handle H will be released. Rod R will drop interiorly of the reactor.

It will be understood that the control rod mechanism is preferably used interior of a sodium cooled fast breeder reactor. Accordingly, sodium and an inert cover gas 26 are maintained at the top of the reactor. In order to maintain isolation of the inert cover gas from the atmosphere, a first exterior bellows 28 surrounds the driveline L and is connected between the reactor at 30 and the driveline at 32. A second bellows mechanism is connected between the interior of cylinder C at 34 and the tension rod at 36. The reader will understand that a fluid type seal exists within the driveline L to prevent contamination with atmospheric gas.

Having set forth the overall construction of the drive mechanism, attention will now be devoted to FIGS. 3A, 3B, 4A, 4B and 4C. The handle segment H at the upper end of the rod R will first be discussed with reference to FIG. 3A. Thereafter, the grapple segments will be set forth with reference to FIGS. 3A, 3B, 4A, 4B, and 4C.

Rod R is typically connected by a cylindrical rod handle 40. As shown here, handle 40 flares outwardly in an inverted frustum to expanded cylindrical portion 43. Thereafter, the handle portion again decreases in section at contracting frustum portion 44. An upward flange portion 45 terminates the upper handle surface.

A cylindrical centering pin 47 protrudes upwardly from handle surface 45. It terminates in a gathering pin point 49.

Handle H forms essentially a male member. This male member is received in the female concavity of the grapple G. Centering pin 47 is received in the lower portion of the tension rod T, which lower portion will now be described.

Tension rod T at lower end 50 defines a flange 52. Flange 52 includes a central pin receiving aperture 54. Aperture 54 includes lowered gathering surface 56. It will therefore be understood that when tension rod T is lowered towards handle H, centering of the pin 47 within the aperture 54 will occur.

Turning now to FIG. 4A, a grapple segment S is illustrated. Seeing FIG. 4B it can be seen that each grapple segment S comprises 60° (degrees) of a total grapple mechanism G. Grapple segment S will first be described with respect to that section which confronts the handle H. Thereafter, the grapple segment will be described with respect to the exterior portion which confronts the interior lower portion of cylinder C.

Each grapple segment is rounded. Since six grapple segments define a circular grapple, the segments each include 60° (degrees) of curvature. For simplicity, the following description will include a description of the profile of a longitudinal section. The reader's understanding of the curvature of all the segments will be assumed.

There are two exceptions to this curvature. These exceptions are surfaces 72 and 74. As will hereinafter become apparent, these are surfaces on which the segments rock. A straight surface is preferred.

Grapple segment S includes a lower gathering surface 60. This surface typically bears against frustum 44 on handle H when handle H is received causing the segment S to pivot outwardly. (See FIG. 3A.)

A constriction point 64 includes an upper beveled segment 62. When six such segments are combined, the respective combined segments provide a female cavity on which frustum 42 of handle H rests to effect engagement between the grapple G and the handle H. (See FIG. 3A again.)

The interior of the segments S must contain in the entirety the handle H. Therefore when frustum 42 is contained at segment 62, cylindrical portion 43 abuts indentation 63. Upper member 68 accommodates the profile of frustum portion 44.

Segment S is designed for pivot about flange 52 on the lower end of tension rod T. Accordingly, there is a flange receiving indentation 70. Indentation 70 includes upper bearing surface 72 for bearing on the top surface of flange 52 and lower bearing surface 74 for bearing on the bottom surface of flange 52.

Pivotal interaction between the top surface 45 of the enlarged portion of the handle H and each segment is required. Therefore an inwardly extending segment member 76 is provided with a lower bearing surface 78. As will hereinafter be emphasized with respect to the view of FIG. 3A, the interaction between surface 78 and surface 72 of flange receiving portion 70 causes the grapple segment to move inwardly relative to the other grapple segments to cause capture of the handle H within grapple G.

The outer portion of the grapple segments S is simpler of detail. Three major portions of this outer segment are of concern.

First, opposite flange receiving portion 70 the outer segment S is given at section 80 a thickness so that the inner portion of the cylinder C is loosely abutted. This thickness makes sure that the assembled grapple G is maintained firmly about the lower flange 52 on the tension rod T.

Secondly, each segment is provided with a lower protruding flange portion 82. Lower protruding flange portion 82 restricts opening of each segment S of the grapple to close the grapple G itself. Specifically, when segment 82 is within the cylinder C, the grapple is closed and the handle H may not enter or leave.

Finally, and between shoulder 80 and annulus 82, there is a tapered portion 84 of the segment. Tapered portion 84 gradually constricts the overall dimension of the grapple G in a downward flaring frustum shape. This shape ends at annulus 82. This portion 84 ensures that when annulus 82 clears the bottom of cylinder C, the grapple segment may pivot outwardly so as to release and/or receive handle H.

Having completely described the handle H, the single grapple segment S, the assembled female configuration of the grapple G by confrontation of six of the segments S may be understood.

First, the assembled segments S form a flange receiving portion 170.

Secondly, the assembled segments form a gathering portion 160.

Finally, the assembled segments form a handle capturing portion 163.

Bearing in mind these respective portions, attention will now be directed to the cartoon series of FIG. 2A together with the sections of FIGS. 3A and 4A to describe operation.

First, assembly of FIG. 2A can easily be understood. Six segments S are assembled around a tension rod T at flange 52. The tension rod T and flange 52 are moved interior of the cylinder C. Cylinder C captures the segments between flange portion 70 and shoulder 80. Grapple segments S are constricted as a unitary body about the lower part of the tension rod T.

To initially engage a rod R at handle H with respect to FIG. 2A, tension rod T is released at flange 20 by electromagnet 22. Flange 82 of the grapple segments S extends beyond the lower portion of cylinder C. The grapple segments S can all open. The cavity interior of the grapple G is open to receive the rod R at handle H. This occurs because gathering surfaces 60 tend to pivot the grapple segments S outwardly.

In the view of FIG. 2B, drive D (not shown in the view of FIG. 2) has been lowered. Grapple G has come into contact with handle H. Even though the flange 82 is not within the cylinder C, closure of the grapple segments S about the handle H occurs. The action by which this occurs can best be explained with references to FIGS. 3A and 4A.

Upon downward movement of the tension rod T, shoulders 74 (see FIG. 4A) and 78 bear respectively against the lower portion of the tension rod T and the flat handle surface 45. Since the respective shoulders 72 and 78 are separated by a lever arm, the particular grapple segment in FIG. 4A attempts to pivot counterclockwise as shown in the view of FIG. 4A. In such counterclockwise pivot, the grapple segments 64 all move to and towards one another. Consequently, handle H is captured at frustum 42 by the constriction 64.

Just as a single segment S moves singularly, all segments S move inwardly collectively. This being the case, grapple G is configured so that when cylinder C moves downwardly relative to the grapple G, all the segments S are confined within it (see FIG. 2C). When the driveline L begins to move upwardly, handle H falls away interior of the female segment defined by the grapple G (see FIG. 2D). However, release cannot occur if electromagnetic 20 engages flange 22. With this engagement, rod R is fully coupled to driveline L.

Referring to FIG. 2E, it is easy to understand how full withdrawal of rod R can occur. Assuming full withdrawal of rod R occurs, all that remains to be explained is the thermal release of FIG. 2F and the electromagnetic release of FIG. 2D.

It will be understood that any relative movement sufficient to clear flange 82 of the lower portion of cylinder C will cause release of the handle H.

Referring to FIG. 2F, it will be remembered that tension rod T is constructed of a material having a relatively high coefficient of expansion. Cylinder C is constructed of a material having a relatively low coefficient of expansion. Further, it is well known to design such bimetallic parts to have precise movement responsive to overall temperature conditions.

Specifically, when tension rod T expands, a large amount and cylinder C expands only a small amount, flange 82 clears the lower portion of cylinder C. Grapple segments S open and handle H is released. Rod R falls and causes SCRAM responsive to its penetration within the reactor core (not shown).

Finally, and with respect to FIG. 2G, control circuits can cause a release of the current to the electromagnetic portion 22. Flange 20 at the upper end of tension rod T is released. When the tension rod is released again, flange 82 clears the lower portion of cylinder C. Handle H is released with the result that rod R effects full core penetration and responsive SCRAM.

The reader will understand that we have illustrated only a single reactor rod. In actual fact many will be used for control of a reactor.

It will be further understood that the particular grapple mechanism here illustrated is exemplary only. For example, the grapple segments shown could be virtually any shape which would co-act with the lower and cylindrical portion of the cylinder to restrict a handle captured in the interior of the device. It will be apparent also that the handle H does not have to have the particular preferred shape here illustrated. The handle could be spherical in shape. Likewise it could be given any imparted shape which could be received and restricted in the lower end of the driveline L.

It will be also understood that the disclosed driveline and grapple can be used with many alternate drives. Examples of some drives include rack and pinion, hydraulic, pneumatic and other equivalent mechanical and electromechanical expedients. Likewise, magnet 20 and flange 22 may have equivalent devices substituted, such as pneumatic, hydraulic and other mechanical and electromechanical expedients.

Likewise, the manner in which the grapple segments attach to the rod can vary. For example, a pivotal attachment between the lower end of the tension rod and the grapple segments may be used. Additionally, the number of grapple segments may vary, although the illustrated six segments are preferred.

What is claimed is:

1. A control rod driveline and grapple for engaging and releasing a control rod from a control rod drive, the combination comprising an enlarged control rod handle including an upwardly flaring frustum and a rod extending from said control rod handle;

a relatively moving outer member;

a tension rod connected to said relatively moving outer member at the upper end and provided with a lower annular flange at the lower end, said tension rod including a female cavity for receiving the upwardly extending rod from said enlarged control rod handle;

a plurality of discrete and independent grapple segments for surrounding and grappling the control rod handle, each grapple segment including a first indentation for engaging and gripping the flange of said tension rod at an upper and interior annulus;

said grapple segments defining collectively an enlarged interior female annulus for confining said control rod handle and collectively defining at the lower extremity a gathering surface to permit said grapple segments to gather said handle upon downward movement;

said relatively moving outer member mounted about said tension rod, said second relatively outer member movable to a first position wherein said grapple segments can move to and from said open position and a second position wherein said grapple segments are restricted to a closed position;

said grapple segments including a first bearing surface on said lower annular flange on said tension rod and a second bearing surface on said control rod handle causing said grapple segments to close about said control rod handle when said tension rod is lowered overlying said control rod;

said grapple segments defining at the bottom peripheral surface adjacent said relatively moving outer member an exterior flange, said exterior flange when confronted to said outer member holding said segments in said closed position and when moving just beyond said relatively moving outer member permitting said segments to completely open whereby a small amount of relative movement between said relatively moving outer member and said tension rod causes release of said control rod;

and means for effective relative movement of said tension rod and said relatively moving outer member to permit said grapple segments to engage said control rod handle and permit said control to be manipulated by said drive.

2. The invention of claim 1 and wherein said said tension rod and said relatively moving outer member are constructed of materials having differential thermal index of expansion whereby said tension rod and said relatively moving outer member move relative one to another to release said rod upon upward thermal excursion of said members.

3. The invention of claim 1 and including an electromagnet between said said tension rod and said relatively moving outer member whereby when said electromagnet is engaged said grapple segments maintain said control rod handle and when said electromagnet is disengaged and said tension rod and said relatively moving outer member move relative to one another to have said grapple segments release said control rod handle.

* * * * *